AMPLITUDE STABILIZED ALTERNATING CURRENT GENERATOR

Filed May 3, 1962

INVENTOR
Martin Niedereder

BY [signature]

ATTYS.

United States Patent Office 3,339,156

Patented Aug. 29, 1967

3,339,156

AMPLITUDE STABILIZED ALTERNATING CURRENT GENERATOR

Martin Niedereder, Munich-Solln, Germany, assignor to Siemens & Halske Aktiengesellschaft, Berlin and Munich, Germany, a German corporation Filed May 3, 1962, Ser. No. 192,210
Claims priority, application Germany, May 3, 1961, S 73,811
4 Claims. (Cl. 331—141)

Figure 1:
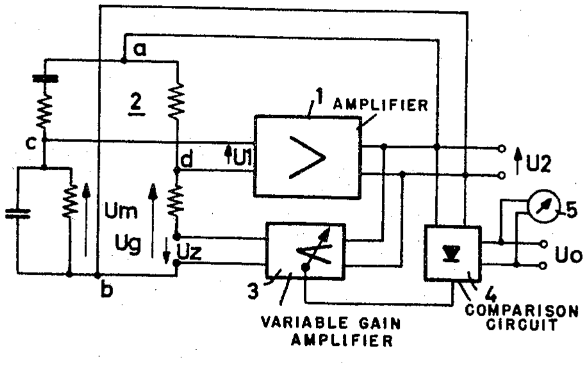

The invention disclosed herein is concerned with an amplitude stabilized alternating current generator comprising a frequency selective network disposed in the feedback circuit of an amplifier, such network producing a positive feedback voltage component as well as a negative feedback voltage component, the difference of said voltage components being conducted to the amplifier input as a feedback voltage, and at least one of said voltage components being frequency dependent and having an extreme value for the frequency which is to be produced.

Assuming a sufficient total amplification in the feedback circuit, such a frequency selective network effects a relatively good frequency constancy of the oscillation which is to be produced, provided that the magnitude relationship of the positive feedback voltage component and of the negative feedback voltage component are so selected that the positive feedback voltage is slightly preponderant only in the immediate vicinity of the frequency to be produced, while there is a strong negative feedback for the remaining frequency regions.

The frequency selective network may, for example, be formed by a Wien bridge containing in two bridge arms resistors with ohmic and capacitive components, while the two remaining bridge arms contain purely ohmic resistors. The feed diagonal, which in such case separates the two adjacent bridge arms with the capacitive resistance component from the two purely ohmic arms, is thereby connected to the amplifier output, while the bridge diagonal at the output side is connected to the amplifier input circuit. With a phase rotation of the amplifier corresponding to an even number multiple of $\pi$, the part of the output voltage which is conducted to the grid of the input stage, constitutes a positive feedback voltage component while the part of the output voltage which is conducted to the cathode of the amplifier input stage, constitutes a negative feedback voltage component. It will be possible, with appropriate mutual association of bridge arms containing the capacitive resistance components, which may also be referred to as phase rotating bridge arms, to select the frequency dependence of the positive feedback voltage component so that there is produced a maximum value for the frequency which is to be generated. The two bridge arms constructed with purely ohmic resistors, that is, the bridge arms which do not effect a phase rotation, can otherwise be dimensioned so that there is imparted to the negative feedback voltage component formed thereby, a frequency independent value such that the positive feedback voltage component is slightly preponderant merely in the immediate vicinity of the frequency to be produced. Since the phase rotating effect of the first noted bridge arms is negligibly small for this frequency, there will result a practically phase-pure positive feedback voltage.

The oscillation which is in this manner excited also results in identical manner upon forming, by corresponding interchange of the phase rotating bridge arms and of the two amplifier input terminals, a frequency dependent negative feedback voltage component, with a minimum value for the frequency to be excited, and a frequency independent positive feedback voltage component.

It is moreover known that a corresponding operation can be obtained with a modified construction of the phase rotating bridge arms, for example, with the aid of series- and parallel resonance circuits, quartz oscillation circuits or filter circuits, provided that the noted frequency dependence of the positive feedback voltage component and the negative feedback voltage component, respectively, are in principle preserved. It is apparent that the second feedback voltage component, which so far has been assumed as being frequency independent, may be frequency dependent, merely requiring that care be exercised to preserve the above described magnitude relations or ratios of the feedback voltage components in the immediate vicinity of the frequency which is to be excited.

In accordance with a further development of this feedback coupling principle, the bridge circuit mentioned by way of example can be substituted by more generally operating selective networks, provided that such networks secure the formation of a positive feedback voltage component as well as of a negative feedback voltage component with the explained frequency requirements. Among such networks are particularly double T-circuits, bridged T-circuits and the like.

However, an important drawback is common to all these known alternating current generators, constructed with the aid of a selective network in the feedback circuit, namely, that, while the frequency stabilization is obtained within the selective network, the amplifier circuit is not only utilized for providing the necessary total amplification in the feedback circuit, but also for the oscillation limitation. This leads, owing to the grid currents which are being formed, to undesired error influences which depend upon changes of the characteristic curve values of the amplifier and which are operative to noticeably reduce the desired frequency constancy of the alternating current generator.

In order to overcome this drawback, it is in accordance with a widely used circuit variant proposed to carry out the limitation of the oscillation amplitude by introducing into the selective network a current dependent resistor. Assuming a proper course of the current dependence, the amplitude of the voltage conducted to the amplifier input will change depending upon the amplitude error of the generator voltage, as compared with a desired value, such that there is effected a correction to this desired value. This measure, applied in connection with the known alternating current generators, makes it possible to obtain a limitation in the production of small values and a linear range, respectively. However, this known solution for the problem causes the following difficulties:

The amplitude constancy of the generator is given by the temperature dependence of the current dependent, non-linear resistors, and is correspondingly affected by fluctuations of the ambient temperature, which situation can be remedied by compensation only to a limited extent. A further disadvantage resides in that the non-linear resistors require for a good amplitude stabilization relatively great heating power. A direct amplitude variation is possible only at the expense of stabilization.

In U.S. Patents Nos. 2,441,567 and 2,568,868 there are described oscillatory circuits in which a stabilization of the output voltage is accomplished in a manner such that the output voltage is compared, with the aid of voltage-comparing means, with a reference voltage, in which system the differential voltage between two voltages to be compared is formed and, in the form of pulse impulses, is supplied to the oscillator input in the form of a negative feedback. This presents the important drawback that the stabilizing of the amplitude of the output voltage brings about simultaneously a distortion of the curve, whereby the distortion in the output voltage is increased.

From U.S. Patent No. 2,923,893 there is known another oscillator arrangement in which a phase-displaced component of the output voltage necessary for the self-excitation is fed back over a "variable gain circuit" to the oscillator input. Here, the variable gain circuit is controlled by the output voltage of a voltage-comparison circuit, in which the oscillator output voltage is compared with a reference voltage. Since the oscillation is brought about substantially solely by said feed-back component, displaced by 90° in phase, of the output voltage, there exists in this circuit the disadvantage that distortions in the feed-back voltage component produce distortions of the oscillator output voltage.

In another known variation of such a generator circuit with a frequency selective network in the feedback branch of an amplifier, there are obtained in the network a positive and a negative feedback voltage component, which are conductive to an input stage of an amplifier which is arranged as a differential amplifier. Here the difference of the two voltage components is active at the amplifier input. A branch of the frequency selective network in this arrangement contains a resistance of controllable magnitude, which consists of a pentode in which the control takes place in dependence on a control voltage, which is formed on the basis of a voltage comparison of a rectified part of the generator output voltage with a reference voltage. The branch which contains the pentode serves for the diversion of the "positive feedback voltage component." It is advantageous in this arrangement that the "positive feedback voltage component," for the self-excitation of the generator oscillation, must have an amplitude of such a magnitude that the non-linearities of the pentode necessarily present adversely affect the curve of the generator output voltage to a relatively great extent.

The present invention provides another solution for this stabilization problem, in which the indicated drawbacks are avoided.

The dimensioning of the frequency selective network, arranged in connection with an amplitude stabilized alternating current generator in the feed back circuit of an amplifier and producing a positive feedback voltage component and also a negative feedback voltage component, the difference of said voltage component being conducted to the amplifier input, and at least one of said voltage components being frequency dependent and having an extreme value for the frequency which is to be produced, is according to the invention so dimensioned that the negative feedback voltage component is at the frequency to be excited preponderant, a positive auxiliary feedback voltage component which slightly overcompensates the difference of both feedback voltage components being simultaneously applied to a branch of said frequency selective network, said auxiliary feedback voltage component being derived from the generator output voltage and being amplitude modulated depending upon a given amplitude error with reference to a desired amplitude value of the generator output.

The advantage obtained by the invention resides, among others, in that the stabilization of the generator voltage is made possible with a power expenditure which lies by about one order of magnitude below that of the known stabilizing arrangements having current dependent resistors in the frequency selective network.

In accordance with another feature of the invention, the auxiliary feedback voltage is derived from the generator output voltage component over a variable gain amplifier which is controlled by the difference voltage formed in the course of a comparison of a rectified part of the generator voltage with a preferably adjustable reference voltage. The advantage obtained thereby resides in that it is possible to effect a direct amplitude adjustment of the generator output voltage outside of the amplifier circuit proper, without affecting the stabilization operation.

Further details and advantages of the alternating current generator according to the invention will appear in the course of the description of the preferred embodiment thereof which is rendered below with reference to the accompanying drawing.

Figure 2:
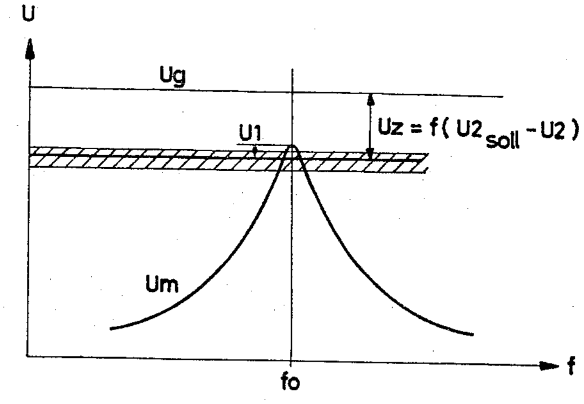

FIG. 1 shows in the form of a circuit diagram an alternating current generator comprising a feedback coupled amplifier with a frequency determining bridge made in the manner of a Wien bridge arranged in the feedback coupling branch; and FIG. 2 is a voltage diagram showing the voltage amplitudes of the feedback voltages in dependence on the frequency.

In FIG. 1, amplifier which is coupled in feedback is indicated by numeral 1, numeral 2 indicating a frequency determining bridge of the kind of a Wien bridge, which is arranged in the feedback circuit. The feed diagonal *a*, *b* is connected to the amplifier output while the bridge diagonal *c*, *d* at the output side, is connected with the input circuit of the amplifier 1. In the illustrated association of the phase rotating bridge arms, *a*, *c* and *c*, *b*, there is derived from the generator output voltage, over the left bridge side *a*, *c*, *b*, a partial voltage $Um$ which is at a maximum at the compensation frequency of the bridge, such partial voltage $Um$ representing a positive feedback voltage, it being presupposed that the amplifier 1 produces a phase rotation of an integral multiple of $\pi$. Over the other bridge arm *a*, *d*, *b*, which contains ohmic resistors, is from the generator voltage derived a frequency independent partial voltage $Ug$ representing a reverse feedback voltage component the difference of said two feedback voltage components is conducted to the input of the amplifier 1 as a feedback voltage.

The bridge 2 is in customary alternating current generators of this kind so dimensioned that the frequency dependent positive feedback voltage component which is derived at *c* predominates at the characteristic working frequency slightly over the negative feedback voltage component derived at *d*. In view of the phase rotation of the arms *a*, *c* and *c*, *b*, which is negligible for this characteristic working frequency, there will be obtained a rather phase pure positive feedback voltage which suffices at the required total amplification in the feedback circuit for the self-excitation conditions. The frequency dependence of the positive feedback voltage component which is derived at *c*, is thereby operative to effect outside of the direct environment of the exciting frequency, a strong reduction of the positive feedback voltage component, so that the negative feedback voltage component predominates for these frequency ranges and, accordingly, the phase requirement for a self excitation of these frequencies, is absent.

As compared with this situation, the bridge 2 is in an alternating current generator according to the invention, so dimensioned, that the positive feedback voltage component $Um$ which is derived at *c* is over the entire frequency range and especially also in the characteristic working frequency, that is, upon reaching the maximum value, lower than or equal to the reverse feedback voltage component $Ug$ which is derived at *d*. This operation may be obtained, for example, by appropriately selecting the resistance ratio of the arms *a*, *d* and *d*, *b*.

Under consideration of the circuit portions so far described, there is then obtained a bridge output voltage which does not correspond to the phase condition of the amplifier 1, to be posed for the self excitation, owing to its reverse coupled phase. This condition of the total circuit is not determined by the properties of the amplifier 1, but practically only by the values of the bridge 2, and therefore can be designated as being very stable.

FIG. 2 shows the amplitudes of the feedback voltage components $Um$ and $Ug$, with respect to the frequency $f$. The positive feedback voltage component $Um$ has thereby, for the frequency $fo$ which is to be excited, a maximum amplitude value, while the negative feedback voltage component $Ug$ is over the entire frequency range and especially also at such frequency $fo$, preponderant as to the magnitude thereof. Accordingly, the excitation requirements are in the case of the illustrated magnitude ratios of the two feedback voltage components $Um$ and $Ug$, not satisfied.

However, in accordance with an important feature of the invention, an auxiliary positive feedback voltage component Uz is conducted to a branch of the network, which at the frequency $fo$ to be produced, slightly overcompensates the difference between Ug and Um, such auxiliary positive feedback voltage component causing appearance of a bridge output voltage U1 which again constitutes a positive resulting feedback voltage with an amplitude which is sufficient for self-excitation at the existing total gain in the feedback circuit. The amplitude of the auxiliary feedback voltage Uz is dependent upon the prevailing amplitude error of the generator output voltage with respect to a given desired value. This may be suitably expressed by the relation $Uz=f(U2_{soll}-U2)$, wherein "soll" refers to desired.

As will be seen from FIG. 2, a relatively slight relative variation of the amplitude of the auxiliary feedback voltage component Uz effects a great relative variation in the bridge output voltage U1. A certain reduction of Uz would theoretically even lead to a phase reversal of the voltage U1 and therewith to a negative resulting feedback voltage U1. However, such behavior is in operating condition impossible since infinitely high amplification in the feedback circuit would have to be assumed for maintaining the oscillation of the generator upon zero passage of the resulting feedback voltage U1. It may be assumed for the practical operation that the alteration range of Uz, as is indicated by the hatched band, approaches the maximum value of $Um$ at the frequency $fo$ only to an extent such that the resulting bridge output voltage U1 does not go below an amplitude which is required for maintaining the oscillation. Since the relative alteration of the bridge output voltage U1 is at a given alteration of Uz the greater, the smaller U1, it is in the interest of an operatively effective amplitude variation of Uz or amplitude stabilization U2 of advantage to place the alteration range of Uz so close to the maximum value of $Um$ as is possible with the total amplification prevailing in the feedback circuit, without deviating from the amplitude requirement which is necessary for the self excitation.

The auxiliary feedback voltage component Uz is in the embodiment shown in FIG. 1 derived from the generator output voltage U2 over a variable gain amplifier 3 which alters the amplitude of $Uz$ depending upon the prevailing amplitude error of the generator output voltage U2, as compared with a given desired value, so that the resulting bridge output voltage U1 effects a correction in accordance with this desired value. The variable gain amplifier 3 is thereby suitably affected by a control voltage which is formed with the aid of a voltage comparison circuit 4 upon comparing a rectified part of the generator output voltage U2 with a preferably adjustable reference voltage $Uo$. Only a very slight useful power is incident to such voltage comparison drawn from the alternating current generator, which is of decisive importance, for example, especially in the case of a portable battery supplied, transistorized generator.

As compared with customary stabilization methods and devices, a considerably improved amplitude constancy is by the described amplitude ratios of the voltage components $Um$, Ug and Uz obtained also in case that the variable gain amplifier 3 consists, for example, only of one single transistor amplifier stage. Moreover, the auxiliary feedback voltage component Uz may be distorted without resulting in a considerable increase of the noise factor of the generator output voltage U2, since the appreciably higher bridge voltage components Ug, $Um$ are not distorted by the linearly constructed bridge arms.

Another advantage of the alternating current generator made according to the invention resides therein that the generator output voltage U2 is to a large extent independent of exterior influences, for example, the ambient temperature, since the difference between the prevailing value and the desired value of the generator output voltage is, in the presence of an appropriately high gain of the variable gain amplifier 3, automatically held very small. All exterior influences are accordingly excluded by the action of the variable gain amplifier 3.

It is finally also possible to measure the amplitude of the reference voltage $Uo$, as a criterion for the amplitude of the generator output voltage U2, directly by use of an indicating instrument 5, thus avoiding the necessity of connecting at the output side an individual measuring circuit.

Preferred fields in which the present invention may be used are offered, in addition to the described embodiment in which the invention is employed is as a generator stabilized with the aid of a Wien bridge, generally in connection with various kinds of bridge stabilized generators including particularly LC-senders. A resonance circuit, for example, a quartz circuit, may be provided for producing the frequency dependency respectively of the positive feedback voltage component and the negative feedback voltage component, which are derived with the aid of the frequency selective network disposed in the feedback circuit.

Changes may be made within the scope and spirit of the appended claims which define what is believed to be new and desired to have protected by Letters Patent.

I claim:

1. An amplitude stabilized alternating current generator, comprising an amplifier having a feedback circuit, containing a frequency selective network, for producing a positive feedback voltage component and a negative feedback voltage component, at least one of said feedback voltage components being frequency dependent and having an extreme value at the operating frequency, circuit means for conducting the difference of said feedback voltage components to the amplifier input, said network being so dimensioned that the negative feedback voltage component predominates slightly at the operating frequency, means for connecting to said feedback circuit an auxiliary feedback voltage acting as a further positive feedback voltage which slightly overcompensates the difference between said positive and negative feedback voltage components, means connected with the output of the amplifier for deriving said auxiliary feedback voltage from the generator output voltage including a variable gain amplifier and means for varying the gain of said variable gain amplifier depending upon a prevailing amplitude error of the generator output voltage with respect to a desired constant value, said last mentioned means for varying the gain comprising comparison means connected with the generator output for comparing the voltage of a rectified part of the generator output voltage with an adjustable reference voltage and thereby forming a resulting difference voltage and means for varying the gain of said variable gain amplifier responsive to said difference voltage.

2. An amplitude stabilized alternating current generator according to claim 1, comprising a measuring device for the amplitude of said reference voltage, said measuring device being calibrated in amplitude values of said generator output voltage.

3. An amplitude stabilized alternating current generator according to claim 1, wherein said feedback circuit comprises a bridge circuit having a feed diagonal connected to the amplifier output, said feed diagonal mutually separating the bridge sides serving respectively for the derivation of the positive feedback voltage and the negative feedback voltage, and means for connecting with the input terminals of said amplifier the bridge corner points lying within the bridge sides.

4. An amplitude stabilized alternating current generator according to claim 3, wherein said selective network comprises a resistance and capacitance combination with said feedback circuit being constructed in the manner of a Wien bridge.

References Cited

UNITED STATES PATENTS

| | | | |
|---|---|---|---|
| 2,441,567 | 5/1948 | Darlington | 331—183 X |
| 2,568,868 | 9/1951 | Pratt | 331—142 |
| 2,749,441 | 6/1956 | Kelly | 331—137 |
| 2,923,893 | 2/1960 | Runyan | 331—140 X |

FOREIGN PATENTS

| | | |
|---|---|---|
| 644,083 | 10/1950 | Great Britain. |

ROY LAKE, *Primary Examiner.*

JOHN KOMINSKI, *Examiner.*

J. B. MULLINS, *Assistant Examiner.*